United States Patent
Aradi et al.

(10) Patent No.: US 7,094,274 B2
(45) Date of Patent: Aug. 22, 2006

(54) USE OF MANGANESE COMPOUNDS TO IMPROVE THE EFFICIENCY OF AND REDUCE BACK-CORONA DISCHARGE ON ELECTROSTATIC PRECIPITATORS

(75) Inventors: Allen A. Aradi, Richmond, VA (US); Michael W. Adams, Midlothian, VA (US); Stephen A. Factor, Richmond, VA (US)

(73) Assignee: Afton Chemical Intangibles LLC, Richmond, VA (US)

( * ) Notice: Subject to any disclaimer, the term of this patent is extended or adjusted under 35 U.S.C. 154(b) by 0 days.

(21) Appl. No.: 10/420,028

(22) Filed: Apr. 17, 2003

(65) Prior Publication Data

US 2004/0206236 A1    Oct. 21, 2004

(51) Int. Cl.
*B03C 3/013* (2006.01)

(52) U.S. Cl. ............... 95/58; 44/359; 95/64; 95/65; 95/71; 96/52; 96/74; 110/342; 110/345

(58) Field of Classification Search ............ 96/27, 96/52, 53, 74; 95/58, 64, 65, 71; 110/342–345; 44/364–366
See application file for complete search history.

(56) References Cited

U.S. PATENT DOCUMENTS

| | | | | |
|---|---|---|---|---|
| 2,943,925 | A | * | 7/1960 | Ambrose ............... 44/306 |
| 3,284,990 | A | | 11/1966 | Orne .................. 95/59 |
| 3,692,503 | A | * | 9/1972 | Kukin ................. 44/354 |
| 4,035,530 | A | * | 7/1977 | Stoldt ................ 427/252 |
| 4,512,774 | A | * | 4/1985 | Myers et al. ........... 44/301 |
| 4,843,980 | A | | 7/1989 | Markham et al. ........ 110/342 |
| 5,591,412 | A | * | 1/1997 | Jones et al. ............ 422/171 |
| 5,681,375 | A | | 10/1997 | West et al. ............. 96/19 |
| 5,814,135 | A | * | 9/1998 | Weinberg ............... 96/58 |
| 6,042,637 | A | * | 3/2000 | Weinberg ............... 96/58 |
| 6,267,802 | B1 | * | 7/2001 | Baldrey et al. ........... 95/58 |
| 6,729,248 | B1 | * | 5/2004 | Johnson et al. .......... 110/342 |
| 6,773,471 | B1 | * | 8/2004 | Johnson et al. .......... 44/620 |
| 6,818,043 | B1 | * | 11/2004 | Chang et al. ............ 95/37 |

FOREIGN PATENT DOCUMENTS

| | | | |
|---|---|---|---|
| AU | 44721/79 | * | 3/1979 |
| DE | 28 09 199 A1 | | 9/1979 |
| EP | 0 018 084 B1 | | 4/1983 |
| FR | 2502300 | * | 9/1982 |
| GB | 1061161 | * | 3/1967 |
| GB | 1189356 | * | 4/1970 |

OTHER PUBLICATIONS

White, Harry J.; "Fly Ash and Furnace Gas Characteristics," Journal; Feb. 1977; pp. 114-120; vol. 27, No. 2.; Journal of the Air Pollution Control Association; Pittsburgh, PA.

(Continued)

*Primary Examiner*—Richard L. Chiesa
(74) *Attorney, Agent, or Firm*—Dennis H. Rainear; Paige J. Thomson; J. Clay Matthews

(57) ABSTRACT

Manganese is added to a combustion fuel, combustion air, or the resulting combustion exhaust gas in order to improve the efficiency of an electrostatic precipitator in collecting the resulting fly ash. Further, manganese or other flame suppressant is added to a fuel, and/or combustion air, or combustion exhaust gas stream in order to reduce back-corona discharge that could otherwise occur in an electrostatic precipitator.

27 Claims, 4 Drawing Sheets

Fly Ash Mineral Composition Change with Addition of a Manganese Source to the Fuel

OTHER PUBLICATIONS

Linteris, Gregory; "Final Report: Effective Non-Toxic Metallic Fire Suppressants;" May 2002; pp. 1-81; NISTIR 6875; U.S. Department of Commerce, Technology Administration, National Institute of Standards and Technology; Gaithersburg, Maryland.

Derwent Abstract No. 66493B/37; METALLGESELLSCHAFT AG, "Sepg. dust with high electric resistance from hot waste gas—by adding catalyst to convert suplhur di:oxide into sulphur tri:oxide, then using electrostatic filters;" DT 2809199; Sep. 6, 1979.

* cited by examiner

USE OF MANGANESE COMPOUNDS TO IMPROVE THE EFFICIENCY OF AND REDUCE BACK-CORONA DISCHARGE ON ELECTROSTATIC PRECIPITATORS

FIELD OF THE INVENTION

The present invention relates to improving the efficiency and operation of electrostatic precipitators in utility and industrial furnace systems. Specifically, the addition of manganese in fuel, in the combustion air, or in combustion exhaust gas (flue gas) increases the efficiency of an electrostatic precipitator in collecting the fly ash from the combustion gas. Further, the addition of manganese or other flame suppressant materials into fuel, into combustion air, or into combustion exhaust gas reduces back-corona discharge in electrostatic precipitators, thus also improving fly ash collection efficiency.

BACKGROUND OF THE INVENTION

The environmental issues and concerns with respect to smoke stack emissions are well recognized. One of the combustion exhaust gas products that receives considerable attention is fly ash. Much technology and effort has been dedicated to reducing fly ash emissions that are the result of the combustion of hydrocarbonaceous fuel in a combustion unit.

Electrostatic precipitators are one significant type of technology used to reduce fly ash emissions. The basic process used in electrostatic precipitators includes the creation of an electric field in a pipe or passage through which a combustion exhaust gas, including fly ash, flows. When the gas flows through the electric field, particles in the gas (fly ash) pick up a negative charge from the electrons given off by an emitter source. These particles in the gas build up a negative charge and are then attracted to the positive charge on a grounded collector plate. Those particles are then collected there. The fly ash is subsequently collected from the plates by physically rapping the plates and collecting the fly ash that falls off into hoppers where it is then removed.

The efficiency of electrostatic precipitators is affected by several basic factors, one of which is the resistivity of the fly ash particles that the system is trying to collect. For normal operation, the resistivity of the fly ash should lie between about $1 \times 10^8$ and $1 \times 10^4$ Ohm-cm. Values above this range lead to back corona discharge, and below this range lead to re-entrainment of the fly ash back into the exhaust stream because the particles of very low resistivity loose their negative charge very easily. Carbon in the fly ash lowers the resistivity so much that efficient collection in the ESP is impeded. If the particles are highly conductive (i.e., have an excessively low resistivity), then the particles give up there charges very easily and are relatively difficult to retain on a collector plate. An example of this is high carbon content in fly ash, which is known to contribute to electrostatic precipitator inefficiency. On the other hand, very high resistivity particles will retain their charge even after being collected on the collector plates. These high resistivity particles, while initially easy to collect, may form an insulating layer on the collection plates of a system. After a relatively short period of time, the build up of those particles may block the electric flow necessary for the efficient operation of systems.

This build up of high resistivity particles on collector plates also presents other performance problems. One of these problems is referred to as "back-corona" discharge which is a spark or arc across the electric field as a result of the voltage gradient build-up across the collected particle layer on the collector plate. If the electrostatic precipitator voltage becomes too large because of excessively high resistivity of the fly ash (above $10^9$ Ohm cm), gas trapped in this particle layer can ionize and break down, thereby causing a spark or flare that substantially reduces the efficiency of the electrostatic precipitator. Every time this event occurs, there is a "puff" of increased smoke out of the exhaust chimney that is recorded as a transient increase in flue gas opacity. To inhibit this event, ESP controls back off on the potential between the electrodes (reduce the voltage to the electrodes), thereby leading to performance inefficiency and an increase in steady state exhaust opacity.

Particle resistivity can be manipulated and improved by modifying the fuel to be combusted or by modifying the combustion gas before it flows through an electrostatic precipitator. Blending fuels that give off high and low resistivity particles is one way to obtain a desired resistivity in a combustion gas. Alternatively, a combustion gas may be modified or conditioned to make it have the desired resistivity. One of the most recognized methods of modifying or conditioning a combustion exhaust gas is to add sulfur trioxide ($SO_3$) vapor into a combustion exhaust gas stream. The addition of $SO_3$ lowers resistivity. The amount of $SO_3$ can be varied depending on a particular fuel combustion exhaust gas and other operating parameters. Drawbacks of sulfur-type emissions are also recognized, so other types of treatments are desired.

SUMMARY OF THE INVENTION

Accordingly, it is an object of the present invention to add a source of manganese to a combustion fuel or to the combustion air, or to the resulting combustion exhaust gas in order to improve the efficiency of an electrostatic precipitator in collecting the resulting fly ash. Further, it is an object of the present invention to add a source of manganese or other flame suppressant to a fuel or combustion air, or combustion exhaust gas stream in order to reduce back-corona discharge that could otherwise occur in an electrostatic precipitator.

In one embodiment, the invention includes a method for improving the efficiency of an electrostatic precipitator used to collect fly ash from a combustion exhaust gas resulting from the combustion of a fuel in a combustion unit. The method comprises adding to the fuel an effective amount of a source of manganese. Alternatively, the method comprises adding to the combustion exhaust gas an effective amount of a source of manganese.

In a further alternative, the invention includes a method of reducing back-corona discharge in electrostatic precipitators used to collect fly ash from a combustion exhaust gas resulting from the combustion of a fuel in a combustion unit. This method comprises adding to the fuel an effective amount of a source of manganese. Alternatively, the method comprises adding to the combustion exhaust gas an effective amount of a source of manganese. Still further alternatively, the method comprises adding to the combustion exhaust gas an effective amount of an additive selected from the group consisting of inorganic and organic compounds of transition metals, actinides, lanthanides, alkali and alkaline earth metals, metalloids, halogens, phosphorus, and sulfur. Also alternatively, the method may include adding to the combustion exhaust gas an effective amount of an oxygenate.

In connection with any of the foregoing methods, a combustion unit may be selected from the group consisting of any and all burners, stationary burners, waste incinerators, diesel fuel burners, gasoline fuel burners, power plant generators, power plant furnaces, any and all internal and external combustion devices, boilers, furnaces, evaporative burners, plasma burner systems, plasma arc, and devices that can combust or in which can be combusted a hydrocarbonaceous fuel.

Also with respect to any of the foregoing methods, the fuel may be selected from the group consisting of diesel fuel, biodiesel, biodiesel-derived fuel, synthetic diesel, jet fuel, alcohols, ethers, kerosene, low sulfur fuels, synthetic fuels, Fischer-Tropsch fuels, liquid petroleum gas, fuels derived from coal, coal, genetically engineered biofuels and crops and extracts therefrom, natural gas, propane, butane, unleaded motor and aviation gasolines, reformulated gasolines which contain both hydrocarbons of the gasoline boiling range and fuel-soluble oxygenated blending agents, gasoline, bunker fuel, coal (dust or slurry), crude oil, refinery "bottoms" and by-products, crude oil extracts, hazardous wastes, yard trimmings and waste, wood chips and saw dust, agricultural waste, fodder, silage, plastics, organic waste, and mixtures thereof, and emulsions, suspensions, and dispersions thereof in water, alcohol, and other carrier fluids.

Also alternatively, the source of manganese may be selected from the group consisting of methyl cyclopentadienyl manganese tricarbonyl, cyclopentadienyl manganese tricarbonyl, bis-cyclopentadienyl manganese (manganocene), bis-alkyl cyclopentadienyl manganese, manganese sulfonate, manganese phenate, manganese salicylate, alkyl cyclopentadienyl manganese tricarbonyl, organic manganese tricarbonyl derivatives, alkyl cyclopentadienyl manganese derivatives, neutral and overbased manganese salicylates, neutral and overbased manganese phenates, neutral and overbased manganese sulfonates, manganese carboxylates, and combinations and mixtures thereof.

In a still further embodiment, a fuel is adapted to be combusted in a combustion unit to result in a combustion exhaust gas, said fuel improving the efficiency of an electrostatic precipitator used to collect fly ash from the combustion gas. The fuel comprises an effective amount of a source of manganese. Alternatively, the invention is an additive for a fuel wherein the fuel additive comprises an effective amount of a source of manganese. Alternatively, the additive may be adapted to be injected into the combustion exhaust gas, said additive comprising an effective amount of a source of manganese.

In a still further embodiment, a fuel that is adapted to be combusted in a combustion unit to result in a combustion exhaust gas reduces back-corona discharge in an electrostatic precipitator used to collect fly ash from the combustion exhaust gas. The fuel comprises an effective amount of a source of manganese. Alternatively, an additive for a fuel may comprise an effective amount of manganese. Still further, an additive comprising an effective amount of a source of manganese ; or organic and inorganic compounds of transition metals, actinides, lanthanides, alkali or alkaline earth metals metalloids, halogens, phosphorous, or sulfur; or an oxygenate may be injected into the combustion exhaust gas resulting from the combustion of a fuel in a combustion unit.

In another alternative embodiment, the invention includes a method for improving the efficiency of an electrostatic precipitator used to collect fly ash from a combustion exhaust gas resulting from the combustion of a fuel and combustion air in a combustion unit. The method comprises adding to the combustion air an effective amount of a source of manganese.

In another further embodiment, the invention includes a method of reducing back-corona discharge in an electrostatic precipitator used to collect fly ash from a combustion exhaust gas resulting from the combustion of a fuel and combustion air in a combustion unit. The method comprises adding to the combustion air an effective amount of a source of manganese or an effective amount of an inorganic or organic compound of transition metals, actinides, lanthanides, alkali or alkaline earth metals, metalloids, halogens, phosphorous or sulfur.

DETAILED DESCRIPTION OF THE INVENTION

Figure 1:
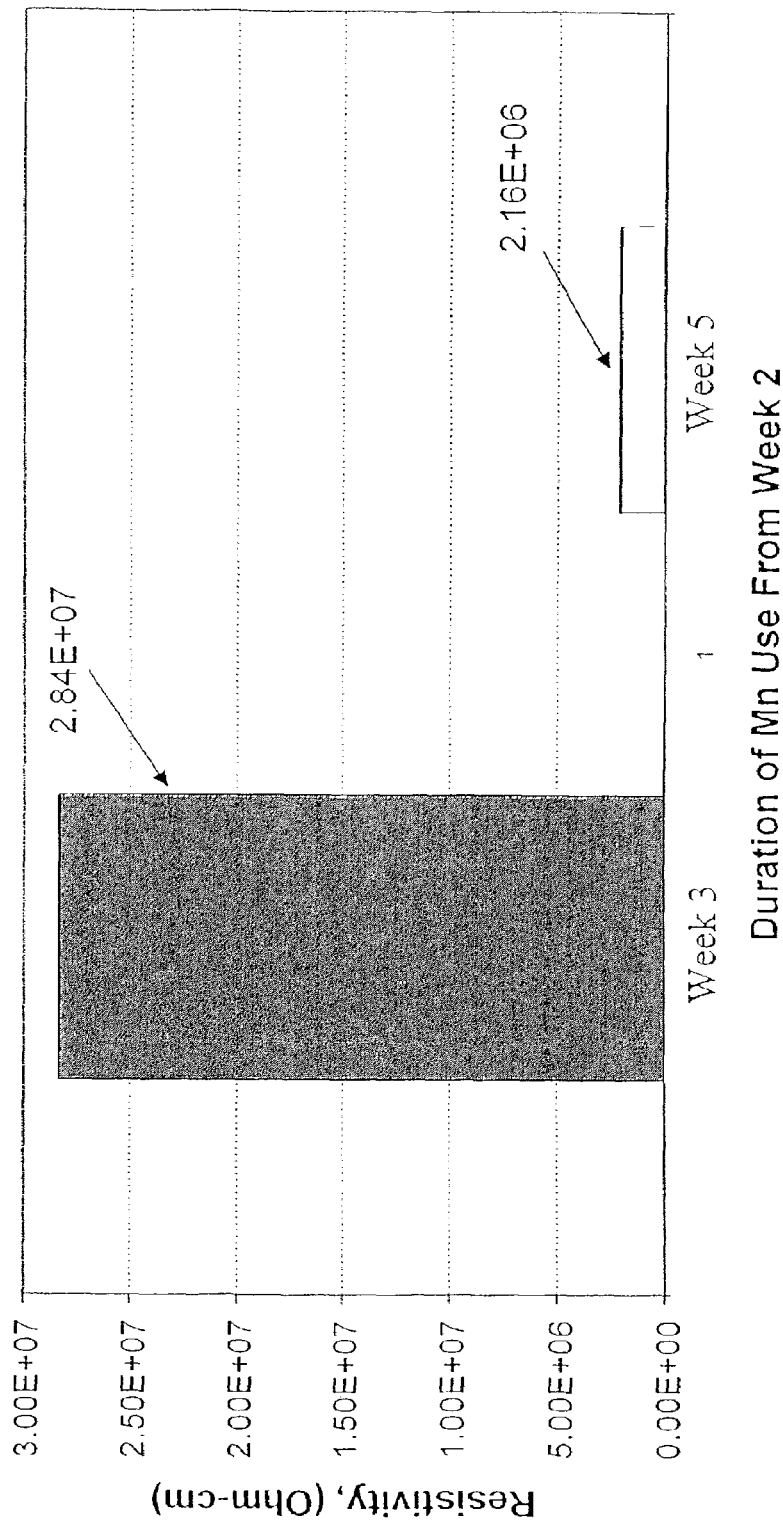
FIG. 1 is a graph demonstrating comparative fly ash resistivities of a combustion gas during a trial experiment.
Figure 2:
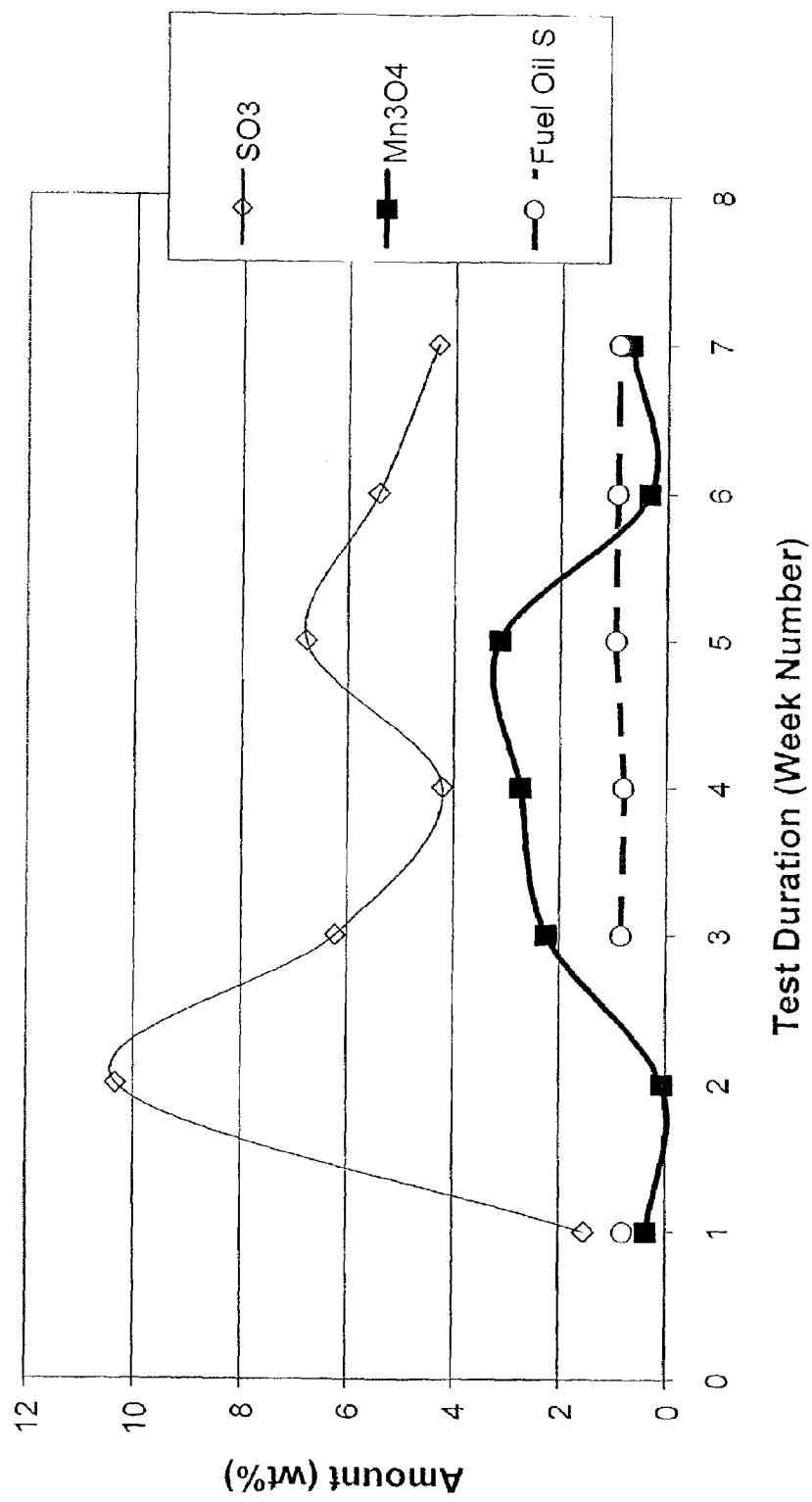
FIG. 2 is a graph demonstrating the fly ash mineral composition change as a result of the addition of a manganese source to the fuel in the trial experiment.

The focus of the present invention and the improvement described herein is to enhance the operation of electrostatic precipitators (ESP's) in collecting fly ash from combustion exhaust gas that results from the combustion of a hydrocarbonaceous fuel with combustion air in a combustion unit. Thus, according to one embodiment of the present invention, an effective amount of a source of manganese is added to the fuel, to the combustion air, or to the combustion exhaust gas to improve the resistivity of fly ash, thereby making the collection of the fly ash by the ESP more efficient. Whether added before or after combustion, the manganese reacts with, coats, or otherwise becomes intermingled with the fly ash to impart improved resistivity attributes thereto and, and thereby improve the efficiency of the ESP operation.

An effective amount of a source of manganese added to a fuel or to the combustion air, for example and without limitation, is between about 2 and 200 ppm wt/wt percent manganese in the fuel. More preferably, the effective amount of a source of manganese added is between about 5 and 50 ppm wt/wt percent manganese in the fuel. It may be used in burners such as those found in industrial furnaces and utility power generation furnaces. This manganese can be added to the fuel as noted or also directly to the combustion air, or the combustion exhaust gas stream at any time before the combustion exhaust gas reaches the ESP system. The treat rate of the additive in the combustion exhaust gas should range between about 0.5 and 3 wt % manganese relative to the weight of the fly ash.

In addition to improving the operation of an ESP by improving resistivity of the fly ash, the present invention is also addressed to the problem in ESP's of back-corona discharge. In this embodiment, the improvement of the present invention includes use of manganese in fuel, in combustion air, and/or in a combustion exhaust gas stream to reduce back-corona discharge in ESP's. Alternatively, the additive in the fuel, combustion air, or combustion exhaust stream may be another flame suppressant such as inorganic or organic compounds of a transition metal, an actinide, lanthanide, alkali or alkaline earth metal, inorganic and organic halogen compounds, inorganic and organic phosphorus compounds, and inorganic and organic sulfur compounds, each of which has flame suppression capability through some form of free radical or ion quenching mechanism. Still further alternatively, the addition of oxygenates to the combustion exhaust gas stream may similarly reduce back-corona discharge.

The basis for the reduction or inhibition of back-corona discharge is found in the phenomena of flame speed modulation by additives. See generally, Linteris, G., Rumminger, M., Babushok, V., Chelliah, H., Lazzarini, T., and Wanigarathne, P. *Final Report: Non-Toxic Metallic Fire Suppressants*. National Institute of Standards and Technology (NIST), Technology Administration, U.S. Department of Commerce, May 2002. http://fire.nist.gov/bfrlpubs/fire02/PDF/f02011.pdf. Some metals in a fuel decrease the flame speed by quenching combustion radicals and ions that support combustion. Metals such as manganese, under the right combustion conditions, produce combustion products in the flame that serve as radical sinks and significantly decrease the burning velocity of a flame. Accordingly, a manganese-containing additive can be regarded as a flame suppressant that works accordingly to the same mechanism. Namely, on combustion with a fuel, it produces manganese containing combustion products that act as flame radical and ion quenchers.

In operation, an electrostatic precipitator is operated at a very high voltage in order to create a very strong electric field. This high electric field is created because the larger and more powerful the electric field, the more fly ash particles will be attracted to and collected on the collector plates of the system. The upper limits of voltage that may be used to create a strong electric filed are defined by those voltages where the field is so great that a back-corona discharge effect is noted. In other words, an electrostatic precipitator is preferably operated at the highest electric field (highest voltage) possible without seeing the effects of back-corona discharge. Accordingly, to the extent that back-corona discharge may be chemically reduced or eliminated through the use of additives described herein, the efficiency of the electrostatic precipitator may be improved. By reducing back-corona discharge, the use of the additives allows the operator of the ESP to increase the voltage of operation of the ESP and, therefore, increase the efficiency thereof by collecting more fly ash particles. This increased voltage available as a result of the use of the additives identified herein is not otherwise available without creating substantial back-corona discharge and the resulting reduction in efficiency in the electrostatic precipitator.

The use of other transition metals, actinides, lanthanides, alkali and alkaline earth metals, metalloids, inorganic and organic halogen compounds, inorganic and organic phosphorus compounds, and inorganic and organic sulfur compounds, operate by an analogous mechanism of radical and ion quenching in order to limit back-corona discharge on an ESP collector plate. The foregoing compounds are added in the same effective amounts as manganese to the fuel or combustion air. Still further, nonmetallic compounds such as oxygenates that decrease the velocity of flames by producing radical and ion quenching species in the flame will be similarly functional in reducing or inhibiting back-corona discharge. These oxygenates must be introduced into the combustion exhaust gas rather than blended into a fuel or combustion air prior to combustion.

The treat rate of the additive in the combustion exhaust gas should range between about 0.5 and 3 wt % of the respective metal and/or metalloid element relative to the weight of the fly ash. In the case of oxygenates being aspirated or injected into the combustion exhaust gas stream, the oxygenates must be able to deliver 3–10 wt % oxygen relative to the weight of the fly ash. The halogen phosphorus, and sulfur-containing compounds should be treated at 1–3 wt % of the element relative to the quantity of the fly ash.

By "manganese" herein is meant any manganese or manganese-containing material, compound or precursor, such as but not limited to methyl cyclopentadienyl manganese tricarbonyl, manganese sulfonate, manganese phenate, manganese salicylate, cyclopentadienyl manganese tricarbonyl, alkyl cyclopentadienyl manganese tricarbonyl, organic manganese tricarbonyl derivatives, alkyl cyclopentadienyl manganese derivatives, bis-cyclopentadienyl manganese, bis-alkyl cyclopentandienyl manganese, neutral and overbased manganese salicylates, neutral and overbased manganese phenates, neutral and overbased manganese sulfonates, manganese carboxylates, and combinations and mixtures thereof.

According to one embodiment of the present invention, a preferred manganese source is methylcyclopentadienyl manganese tricarbonyl, available from Ethyl Corporation as MMT® Gasoline Additive, or HiTEC® 3000 Performance Additive, or GREENBURN® Fuel Additive.

By "combustion unit" herein is meant any and all internal and external combustion devices, machines, boilers, furnaces, incinerators, evaporative burners, plasma burner systems, plasma arc, stationary burners and the like which can combust or in which can be combusted a hydrocarbonaceous fuel. A "combustion unit" may be fixed and stationary, or it may be mobile (e.g. a railroad locomotive, a truck, etc.). The combustion units effective in the utilization of the present invention include any and all burners or combustion devices, including for example and without limitation herein, stationary burners, waste incinerators, diesel fuel burners, gasoline fuel burners, power plant generators, power plant furnaces, and the like. The hydrocarbonaceous fuel combustion units that may benefit from the present invention include all combustion units, systems, devices, and/or engines that burn or oxidatively decompose hydrocarbonaceous fuels.

Fuels suitable for use in the operation of combustion units of the present invention include hydrocarbonaceous fuels such as but not limited to diesel fuel, jet fuel, alcohols, ethers, kerosene, low sulfur fuels, synthetic fuels, such as Fischer-Tropsch fuels, liquid petroleum gas, fuels derived from coal, coal, genetically engineered biofuels and crops and extracts therefrom, natural gas, propane, butane, unleaded motor and aviation gasolines, and so-called reformulated gasolines which typically contain both hydrocarbons of the gasoline boiling range and fuel-soluble oxygenated blending agents, such as alcohols, ethers and other suitable oxygen-containing organic compounds. Other fuels that are useful in the methods and combustion units of the present invention are gasoline, bunker fuel, coal (dust or slurry), crude oil, refinery "bottoms" and by-products, crude oil extracts, hazardous wastes, yard trimmings and waste, wood chips and saw dust, agricultural waste, fodder, silage, plastics and other organic waste and/or by-products, and mixtures thereof, and emulsions, suspensions, and dispersions thereof in water, alcohol, or other carrier fluids. By "diesel fuel" herein is meant one or more fuels selected from the group consisting of diesel fuel, biodiesel, biodiesel-derived fuel, synthetic diesel and mixtures thereof.

The term "combustion air" includes ambient or pressurized air or any other oxidant that is combusted with a fuel in a combustion unit. The oxidant may be gaseous or it may be liquid or solid or mixtures or precursors thereof. The combustion air may be additized prior to combustion or otherwise modified to meet or maximize the efficiencies of the combustion unit.

Oxygenates suitable for optional use in the present invention include methanol, ethanol, isopropanol, t-butanol, mixed alcohols, ethers such as methyl tertiary butyl ether, tertiary amyl methyl ether, ethyl tertiary butyl ether and mixed ethers; polyethers such as 2-methoxy ethyl ether (diglyme), triglyme; polyols; poyether alcohols such as di(ethylene glycol) monomethyl ether, and mixtures thereof.

Examples of transition metals that are recognized to be flame suppressing by decreasing the burning velocity of flames through mechanisms such as radical and ion quenching are inorganic and organic compounds of V, Cr, Mn, Fe, Co, Y, Zr, Mo, Ru, Rh, Pd Ag, Cd, Hf, W, Re, Os, Ir, and Pt. The lanthanides with similar capabilities are inorganic and organic compounds of La, Ce, Yb, and Lu. Actinides that may be used in this application are inorganic and organic compounds of Th, Pa and U. Metalloids that exhibit a similar function are inorganic and organic compounds of B, Al, Ga, Ge, In, Sn, and Pb. Alkali metal compounds also exhibit some flame retardancy albeit at an order of magnitude higher than the corresponding transition metal concentrations. Some of the metals exhibiting this feature are inorganic compounds of Li, Na, K, Rb, and Cs. Organic and inorganic compounds of alkaline earth metals such as those of Mg, Ca, Sr, and Ba perform in a similar fashion to alkali metals.

Trial Experiment

The present invention was tested in a trial at power plant generator burning number 6 fuel oil. During the experiment, various observations and measurements were recorded as noted in FIGS. 1–4. During the experiment, measurements were taken during week 1 when fuel without any additives or treatment as claimed in the patent was burned. Subsequently, from the beginning of week 2 until the end of week 5, a source of manganese was added to the fuel burned in the generator at a treatment rate of 15 ppm wt % manganese in relationship to the weight of the fuel burned. It is noted that the additized fuel used at the plant remained relatively constant for most of the duration of the trial. Finally, after the four weeks of treatment, the final two weeks 6 and 7, were again run on fuel without a source of manganese added.

Because of fuel source variability, it is not uncommon for the fly ash resistivity to span a large resistivity range in the same burner unit. In order to control the efficiency of the ESP to counteract this variability, sulfur trioxide ($SO_3$) is often dosed into the flue gas upstream of the ESP. The $SO_3$ is used to lower the fly ash resistivity into the acceptable ESP performance value. This being the case, before one can ascertain the impact of an additive on ESP efficiency, care must be taken to ensure that all resistivity comparisons are carried out at the same $SO_3$ concentration in the fly ash.

FIG. 1 shows the fly ash resistivity change as a result of a manganese additive dosed in Number 6 fuel oil at a treat rate that delivers about 20 ppm wt % manganese to the fuel. The change was determined between week 3 and week 5 because these were the time periods in the testing when the flue gas contained comparable levels of $SO_3$, as can be seen in the FIG. 2 graphic. The resistivity value change from a high of $2.84 \times 10^7$ to a low of $2.16 \times 10^6$, shown in FIG. 1, is attributed to the effect of the manganese added to the fuel. This lowering of fly ash resistivity with duration of manganese use results in significant ESP efficiency.

Figure 3:
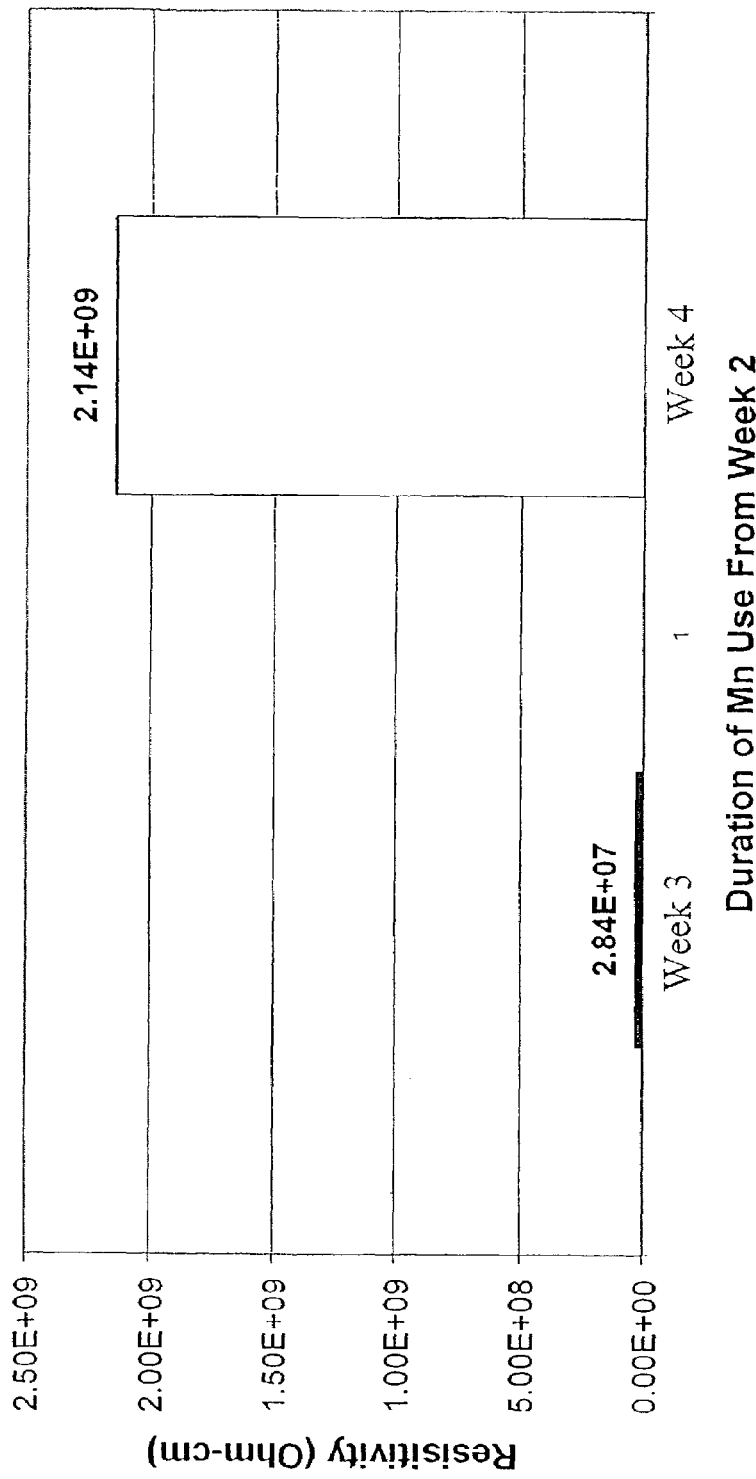
FIG. 3 demonstrates that an increase in resistivity during the trial experiment did not result in back-corona discharge. (See FIG. 4).
Figure 4:
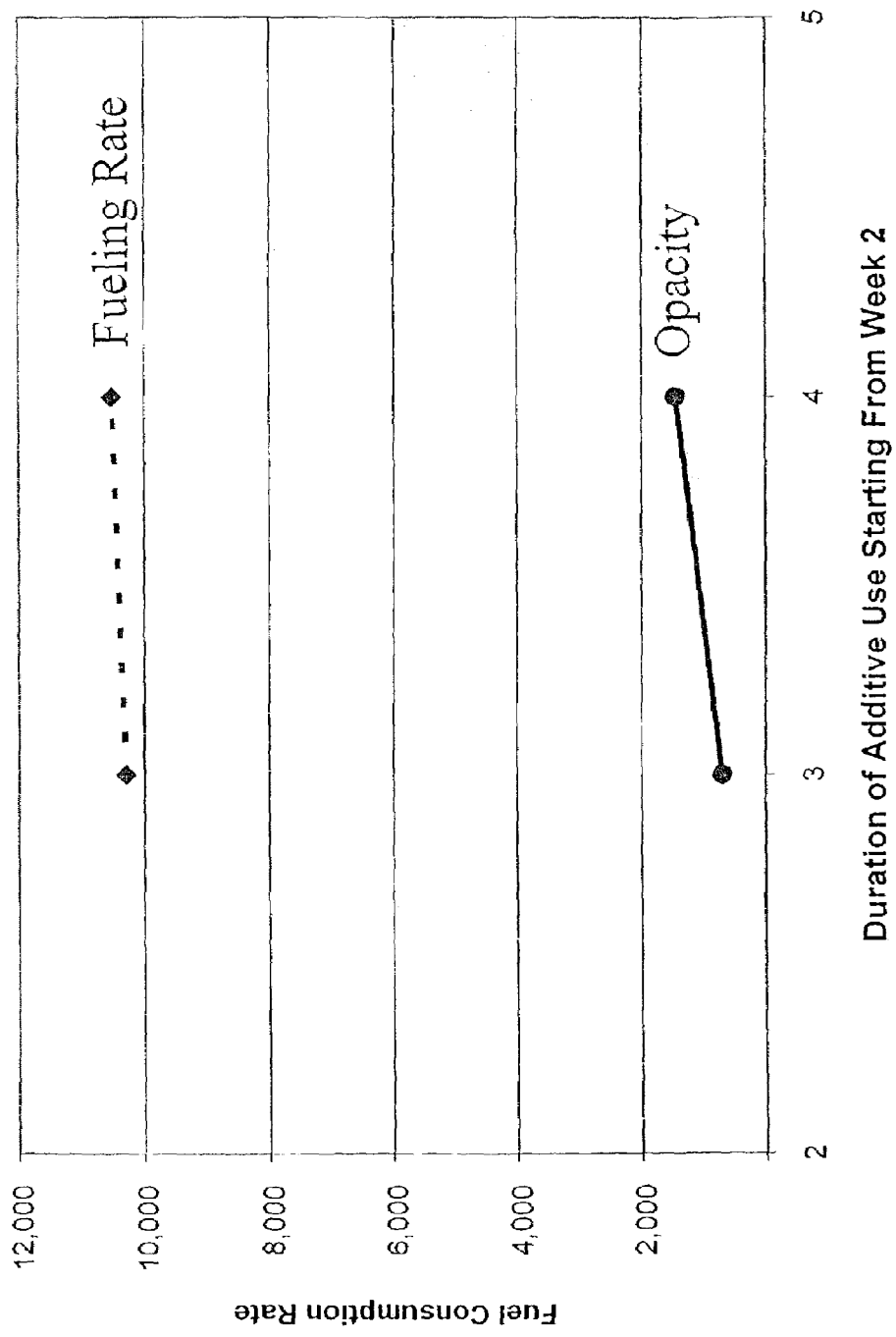
FIG. 4 is a graph demonstrating the oil usage versus stack opacity of a portion of the trial run of the present invention.

Some fuels burn in combustion units to produce fly ash with a high resistivity. Other fuels initially produce fly ash of low resistivity because of a high carbon content, but on subsequent carbon burn out, the resistivity increases significantly. In both cases above, where the resultant back resistivity fly ash enters the ESP, if that resistivity is higher than $1.0 \times 10^9$, then a phenomenon called "high corona discharge" may occur. FIG. 3 shows that between test week 3 and 4 the fly ash resistivity increased from $2.84 \times 10^7$ Ohm-cm to a back corona inducing level of $2.14 \times 10^9$ Ohm-cm. For the ESP to capture fly ash of such a back resistivity, the potential between the electrodes has to be increased in order to force a negative charge onto the fly ash particulate. This high potential may cause the gases trapped in the fly ash layer on the collector anode to ionize. The resulting ions and radicals give a "blue glow" at the anode, and if the ionization is high enough, there is an arc discharge between the electrodes that forces the ESP controls to lower the voltage in order to control this back corona discharge. A lowering of electrical potential between the electrodes directly lowers the ESP efficiency. This would be seen as an increase in flue gas opacity. In addition, every time a back corona discharge event occurs, there is re-entrainment of fly ash from the anode collector plate back into the flue gas flow stream, and can be seen as transient "puff" spikes in flue gas opacity readings. None of this back corona discharge phenomenon was observed in the visual opacity observations made during the testing of the manganese-containing additive. FIG. 4 shows the opacity change between the two test weeks corresponding to the resistivity change in FIG. 3. The lower two data points in FIG. 4 show an increase in opacity from week 3 to week 4. However, this increase is ascribed to the fact that there was a corresponding load increase represented by the upper two data points in FIG. 4, and this fuel throughput increase results in the non-linear opacity increase shown. The lack of any back-corona discharge events is a direct result of the use of manganese in the fuel.

A power plant generator that incorporates a combustion unit is able to output an amount of power directly related to the amount of fuel combusted in the combustion unit. The regulation of opacity level of the combustion exhaust gas from the combustion unit is an effective cap on the amount of power that the power generation unit is allowed to output. In this trial experiment, the power output from the power generation plant may be significantly increased without exceeding a regulated maximum opacity level with use of the claimed additive. Specifically, at the power plant where the trial experiment was run, the power output was increased from a baseline 340 megawatt level to 360 megawatt without exceeding the regulated opacity level. Without the manganese additive, increasing load to over 340 megawatt exceeds regulated opacity level. As demonstrated, therefore, the power generation efficiency of the power plant was increased by more than 5% as a result of using the manganese additive in the combustion unit.

A copending application, Ser. No. 10/322,158, filed Dec. 18, 2002, discusses other benefits identified in the same power plant furnace trial. That application is incorporated herein by reference.

It is to be understood that the reactants and components referred to by chemical name anywhere in the specification or claims hereof, whether referred to in the singular or plural, are identified as they exist prior to coming into contact with another substance referred to by chemical name or chemical type (e.g., base fuel, solvent, etc.). It matters not what chemical changes, transformations and/or reactions, if any, take place in the resulting mixture or solution or reaction medium as such changes, transformations and/or reactions are the natural result of bringing the specified reactants and/or components together under the conditions called for pursuant to this disclosure. Thus the reactants and components are identified as ingredients to be brought together either in performing a desired chemical reaction (such as formation of the organometallic compound) or in forming a desired composition (such as an additive concentrate or additized fuel blend). It will also be recognized that the additive components can be added or blended into or with the base fuels individually per se and/or as components used in forming preformed additive combinations and/or sub-combinations. Accordingly, even though the claims hereinafter may refer to substances, components and/or ingredients in the present tense ("comprises", "is", etc.), the reference is to the substance, components or ingredient as it existed at the time just before it was first blended or mixed with one or more other substances, components and/or ingredients in accordance with the present disclosure. The fact that the substance, components or ingredient may have lost its original identity through a chemical reaction or transformation during the course of such blending or mixing operations or immediately thereafter is thus wholly immaterial for an accurate understanding and appreciation of this disclosure and the claims thereof.

In this specification, reference has been made to a number of U.S. Patents, published foreign patent applications and/or published technical papers. All such cited documents are expressly incorporated in full into this disclosure as if fully set forth herein.

This invention is susceptible to considerable variation in its practice. Therefore the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

Patentee does not intend to dedicate any disclosed embodiments to the public, and to the extent any disclosed modifications or alterations may not literally fall within the scope of the claims, they are considered to be part of the invention under the doctrine of equivalents.

What is claimed is:

1. A method of improving the efficiency of an electrostatic precipitator used to collect fly ash from a combustion exhaust gas resulting from the combustion of a fuel in a combustion unit, the method comprising adding to a fuel an amount of a source of manganese effective to improve the efficiency of the electrostatic precipitator, said effective amount of manganese being between about 2 and 200 ppm wt/wt percent manganese in the fuel and between about 0.5 and 3 wt % manganese relative to the weight of the fly ash.

2. A method of improving the efficiency of an electrostatic precipitator used to collect fly ash from a combustion exhaust gas resulting from the combustion of a fuel in a combustion unit, the method comprising adding to a combustion exhaust gas an amount of a source of manganese effective to improve the efficiency of the electrostatic precipitator, said effective amount of manganese being between about 2 and 200 ppm wt/wt percent manganese in the fuel and between about 0.5 and 3 wt % manganese relative to the weight of the fly ash.

3. A method of reducing back-corona discharge in an electrostatic precipitator used to collect fly ash from a combustion exhaust gas resulting from the combustion of a fuel in a combustion unit, the method comprising adding to a fuel an amount of a source of manganese effective to reduce back-corona discharge in an electrostatic precipitator, said effective amount of manganese being between about 2 and 200 ppm wt/wt percent manganese in the fuel and between about 0.5 and 3 wt % manganese relative to the weight of the fly ash.

4. A method of reducing back-corona discharge in an electrostatic precipitator used to collect fly ash from a combustion exhaust gas resulting from the combustion of a fuel in a combustion unit, the method comprising adding to a combustion exhaust gas an amount of a source of manganese effective to reduce back-corona discharge in an electrostatic precipitator, said effective amount of manganese being between about 2 and 200 ppm wt/wt percent manganese in the fuel and between about 0.5 and 3 wt % manganese relative to the weight of the fly ash.

5. The method of claim 4, wherein the combustion unit is selected from the group consisting of any and all burners, stationary burners, waste incinerators, diesel fuel burners, gasoline fuel burners, power plant generators, power plant furnaces, any and all internal and external combustion devices, boilers, furnaces, evaporative burners, plasma burner systems, plasma arc, and devices that can combust or in which can be combusted a hydrocarbonaceous fuel.

6. The method of claim 4, wherein the fuel is selected from the group consisting of diesel fuel, biodiesel, biodiesel-derived fuel, synthetic diesel, jet fuel, alcohols, ethers, kerosene, low sulfur fuels, synthetic fuels, Fischer-Tropsch fuels, liquid petroleum gas, fuels derived from coal, coal, genetically engineered biofuels and crops and extracts therefrom, natural gas, propane, butane, unleaded motor and aviation gasolines, reformulated gasolines which contain both hydrocarbons of the gasoline boiling range and fuel-soluble oxygenated blending agents, gasoline, bunker fuel, coal (dust or slurry), crude oil, refinery "bottoms" and by-products, crude oil extracts, hazardous wastes, yard trimmings and waste, wood chips and saw dust, agricultural waste, fodder, silage, plastics, organic waste, and mixtures thereof, and emulsions, suspensions, and dispersions thereof in water, alcohol, and other carrier fluids.

7. A method of claim 4, wherein the source of manganese is selected from the group consisting of methyl cyclopentadienyl manganese tricarbonyl, cyclopentadienyl manganese tricarbonyl, bis- cyclopentadienyl manganese (manganocene), bis-alkyl cyclopentadienyl manganese, manganese sulfonate, manganese phenate, manganese salicylate, alkyl cyclopentadienyl manganese tricarbonyl, organic manganese tricarbonyl derivatives, alkyl cyclopentadienyl manganese derivatives, neutral and overbased manganese salicylates, neutral and overbased manganese phenates, neutral and overbased manganese sulfonates, manganese carboxylates, and combinations and mixtures thereof.

8. A fuel that is adapted to be combusted in a combustion unit to result in a combustion exhaust gas, said fuel comprising an amount of a source of manganese effective to improve the efficiency of an electrostatic precipitator used to collect fly ash from a resulting combustion exhaust gas, said effective amount of manganese being between about 2 and 200 ppm wt/wt percent manganese in the fuel and between about 0.5 and 3 wt % manganese relative to the weight of the fly ash.

9. An additive for a fuel to be combusted in a combustion unit to result in a combustion exhaust gas, said fuel additive comprising an amount of a source of manganese effective to improve the efficiency of an electrostatic precipitator used to collect fly ash from the combustion exhaust gas, said effective amount of manganese being between about 2 and 200 ppm wt/wt percent manganese in the fuel and between about 0.5 and 3 wt % manganese relative to the weight of the fly ash.

10. An additive that is adapted to be injected into the combustion exhaust gas resulting from the combustion of a fuel in a combustion unit, said additive comprising an amount of a source of manganese effective to improve the efficiency of an electrostatic precipitator used to collect fly ash from the combustion exhaust gas, said effective amount of manganese being between about 2 and 200 ppm wt/wt percent manganese in the fuel and between about 0.5 and 3 wt % manganese relative to the weight of the fly ash.

11. A fuel that is adapted to be combusted in a combustion unit to result in a combustion exhaust gas, said fuel comprising an amount of a source of manganese effective to reduce back-corona discharge in an electrostatic precipitator used to collect fly ash from the combustion exhaust gas, said effective amount of manganese being between about 2 and 200 ppm wt/wt percent manganese in the fuel and between about 0.5 and 3 wt % manganese relative to the weight of the fly ash.

12. An additive for a fuel to be combusted in a combustion unit to result in a combustion exhaust gas, said fuel additive comprising an amount of a source of manganese effective to reduce back-corona discharge in an electrostatic precipitator used to collect fly ash from the combustion exhaust gas, said effective amount of manganese being between about 2 and 200 ppm wt/wt percent manganese in the fuel and between about 0.5 and 3 wt % manganese relative to the weight of the fly ash.

13. An additive that is adapted to be injected into the combustion exhaust gas resulting from the combustion of a fuel in a combustion unit, said additive comprising an amount of a source of manganese effective to reduce back-corona discharge in an electrostatic precipitator used to collect fly ash from the combustion exhaust gas, said effective amount of manganese being between about 2 and 200 ppm wt/wt percent manganese in the fuel and between about 0.5 and 3 wt % manganese relative to the weight of the fly ash.

14. The composition of claim 13, wherein the combustion unit is selected from the group consisting of any and all burners, stationary burners, waste incinerators, diesel fuel burners, gasoline fuel burners, power plant generators, power plant furnaces, any and all internal and external combustion devices, boilers, furnaces, evaporative burners, plasma burner systems, plasma arc, and devices that can combust or in which can be combusted a hydrocarbonaceous fuel.

15. The composition of claim 13, wherein the fuel is selected from the group consisting of diesel fuel, biodiesel, biodiesel-derived fuel; synthetic diesel, jet fuel, alcohols, ethers, kerosene, low sulfur fuels, synthetic fuels, Fischer-Tropsch fuels, liquid petroleum gas, fuels derived from coal, coal, genetically engineered biofuels and crops and extracts therefrom, natural gas, propane, butane, unleaded motor and aviation gasolines, reformulated gasolines which contain both hydrocarbons of the gasoline boiling range and fuel-soluble oxygenated blending agents, gasoline, bunker fuel, coal (dust or slurry), crude oil, refinery "bottoms" and by-products, crude oil extracts, hazardous wastes, yard trimmings and waste, wood chips and saw dust, agricultural waste, fodder, silage, plastics, organic waste, and mixtures thereof, and emulsions, suspensions, and dispersions thereof in water, alcohol, and other carrier fluids.

16. The composition of claim 13, wherein the manganese is selected from the group consisting of methyl cyclopentadienyl manganese tricarbonyl, cyclopentadienyl manganese tricarbonyl, bis- cyclopentadienyl manganese (manganocene), bis-alkyl cyclopentadienyl manganese, manganese sulfonate, manganese phenate, manganese salicylate, alkyl cyclopentadienyl manganese tricarbonyl, organic manganese tricarbonyl derivatives, alkyl cyclopentadienyl manganese derivatives, neutral and overbased manganese salicylates, neutral and overbased manganese phenates, neutral and overbased manganese sulfonates, manganese carboxylates, and combinations and mixtures thereof.

17. A method of improving the efficiency of an electrostatic precipitator used to collect fly ash from a combustion exhaust gas resulting from the combustion of a fuel and combustion air in a combustion unit, the method comprising adding to the combustion air an amount of a source of manganese effective to improve the efficiency of an electrostatic precipitator, said effective amount of manganese being between about 2 and 200 ppm wt/wt percent manganese in the fuel and between about 0.5 and 3 wt % manganese relative to the weight of the fly ash.

18. A method of reducing back-corona discharge in an electrostatic precipitator used to collect fly ash from a combustion exhaust gas resulting from the combustion of a fuel and combination air in a combustion unit, the method comprising adding to the combustion air an amount of a source of manganese effective to reduce back-corona discharge in an electrostatic precipitator, said effective amount of manganese being between about 2 and 200 ppm wt/wt percent manganese in the fuel and between about 0.5 and 3 wt % manganese relative to the weight of the fly ash.

19. The method of claim 18, wherein the combustion unit is selected from the group consisting of any and all burners, stationary burners, waste incinerators, diesel fuel burners, gasoline fuel burners, power plant generators, power plant furnaces, any and all internal and external combustion devices, boilers, furnaces, evaporative burners, plasma burner systems, plasma arc, and devices that can combust or in which can be combusted a hydrocarbonaceous fuel.

20. The method of claim 18, wherein the fuel is selected from the group consisting of diesel fuel, biodiesel, biodiesel-derived fuel, synthetic diesel, jet fuel, alcohols, ethers, kerosene, low sulfur fuels, synthetic fuels, Fischer-Tropsch fuels, liquid petroleum gas, fuels derived from coal, coal, genetically engineered biofuels and crops and extracts therefrom, natural gas, propane, butane, unleaded motor and aviation gasolines, reformulated gasolines which contain both hydrocarbons of the gasoline boiling range and fuel-soluble oxygenated blending agents, gasoline, bunker fuel, coal (dust or slurry), crude oil, refinery "bottoms" and by-products, crude oil extracts, hazardous wastes, yard trimmings and waste, wood chips and saw dust, agricultural waste, fodder, silage, plastics, organic waste, and mixtures thereof, and emulsions, suspensions, and dispersions thereof in water, alcohol, and other carrier fluids.

21. A method of claim 18, wherein the source of manganese is selected from the group consisting of methyl cyclopentadienyl manganese tricarbonyl, cyclopentadienyl manganese tricarbonyl, bis- cyclopentadienyl manganese (manganocene), bis-alkyl cyclopentadienyl manganese, manganese sulfonate, manganese phenate, manganese salicylate, alkyl cyclopentadienyl manganese tricarbonyl, organic manganese tricarbonyl derivatives, alkyl cyclopentadienyl manganese derivatives, neutral and overbased manganese salicylates, neutral and overbased manganese phenates, neutral and overbased manganese sulfonates, manganese carboxylates, and combinations and mixtures thereof.

22. A method of improving the efficiency of an electrostatic precipitator used to collect fly ash from a combustion exhaust gas resulting from the combustion of a fuel in a combustion unit, the method comprising:

adding to a fuel an amount of a source of manganese effective to reduce back-corona discharge in an electrostatic precipitator; and increasing the voltage in the electrostatic precipitator to a voltage higher than a highest efficient voltage available when combusting a fuel that does not contain the amount of a source of manganese, said effective amount of manganese being between about 2 and 200 ppm wt/wt percent manganese in the fuel and between about 0.5 and 3 wt % manganese relative to the weight of the fly ash.

23. A method of improving the efficiency of an electrostatic precipitator used to collect fly ash from a combustion exhaust gas from a combustion exhaust gas resulting from the combustion of a fuel in a combustion unit, the method comprising:

adding to a combustion exhaust gas an amount of a source of manganese effective to reduce back-corona discharge in an electrostatic precipitator; and increasing the voltage in the electrostatic precipitator to a voltage higher than a highest efficient voltage available when collecting fly ash from a combustion exhaust gas that does not contain the amount of a source of manganese, said effective amount of manganese being between about 2 and 200 ppm wt/wt percent manganese in the fuel and between about 0.5 and 3 wt % manganese relative to the weight of the fly ash.

24. A method of improving the efficiency of an electrostatic precipitator used to collect fly ash from a combustion exhaust gas resulting from the combustion of a fuel and combustion air in a combustion unit, the method comprising:

adding to a combustion air an amount of a source of manganese effective to reduce back-corona discharge in an electrostatic precipitator; and increasing the voltage in the electrostatic precipitator to a voltage higher than a highest efficient voltage available when combusting a combustion air that does not contain the amount of a source of manganese, said effective amount of manganese being between about 2 and 200 ppm wt/wt percent manganese in the fuel and between about 0.5 and 3 wt % manganese relative to the weight of the fly ash.

25. A method to increase power generation efficiency at a power plant that has an electrostatic precipitator used to collect fly ash from a combustion exhaust gas resulting from the combustion of a fuel and combustion air in a combustion unit, the method comprising adding to a fuel an amount of a source of manganese effective to improve the power generation efficiency of a power plant, said effective amount of manganese being between about 2 and 200 ppm wt/wt percent manganese in the fuel and between about 0.5 and 3 wt % manganese relative to the weight of the fly ash.

26. A method to increase power generation efficiency at a power plant that has an electrostatic precipitator used to collect fly ash from a combustion exhaust gas resulting from the combustion of a fuel and combustion air in a combustion unit, the method comprising adding to combustion air an amount of a source of manganese effective to improve the power generation efficiency of a power plant, said effective amount of manganese being between about 2 and 200 ppm wt/wt percent manganese in the fuel and between about 0.5 and 3 wt % manganese relative to the weight of the fly ash.

27. A method to increase power generation efficiency at a power plant that has an electrostatic precipitator used to collect fly ash from a combustion exhaust gas resulting from the combustion of a fuel and combustion air in a combustion unit, the method comprising adding to combustion exhaust gas an amount of a source of manganese effective to improve the power generation efficiency of a power plant, said effective amount of manganese being between about 2 and 200 ppm wt/wt percent manganese in the fuel and between about 0.5 and 3 wt % manganese relative to the weight of the fly ash.

* * * * *